United States Patent
Beutel et al.

(10) Patent No.: US 11,482,840 B2
(45) Date of Patent: Oct. 25, 2022

(54) POLYPHASE SWITCHGEAR ASSEMBLY

(71) Applicant: SIEMENS ENERGY GLOBAL GMBH & CO. KG, Munich (DE)

(72) Inventors: Stefan Beutel, Berlin (DE); Christian Halm, Berlin (DE); Andreas Kleinschmidt, Oranienburg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 65 days.

(21) Appl. No.: 17/269,029

(22) PCT Filed: Jul. 18, 2019

(86) PCT No.: PCT/EP2019/069325
§ 371 (c)(1),
(2) Date: Feb. 17, 2021

(87) PCT Pub. No.: WO2020/035254
PCT Pub. Date: Feb. 20, 2020

(65) Prior Publication Data
US 2021/0184439 A1 Jun. 17, 2021

(30) Foreign Application Priority Data
Aug. 17, 2018 (DE) .......................... 102018213934.2

(51) Int. Cl.
*H02B 1/20* (2006.01)
*H02B 13/035* (2006.01)
*H02B 1/04* (2006.01)
*H02B 13/00* (2006.01)

(52) U.S. Cl.
CPC ................. *H02B 1/04* (2013.01); *H02B 1/20* (2013.01); *H02B 13/00* (2013.01); *H02B 13/0356* (2013.01)

(58) Field of Classification Search
CPC . H02B 1/04; H02B 1/02; H02B 1/022; H02B 5/06; H02B 13/02; H02B 13/035–045; H02B 13/075
See application file for complete search history.

(56) References Cited

U.S. PATENT DOCUMENTS 3,665,257 A * 5/1972 De Heus ................ H01H 31/32
361/615
4,250,535 A 2/1981 Adolph et al.
4,262,323 A * 4/1981 Yoshida .................. H02B 3/00
361/612

(Continued)

FOREIGN PATENT DOCUMENTS

DE 3535938 A1 * 4/1987 ............... H02B 1/22
EP 0005208 A1 11/1979

(Continued)

*Primary Examiner* — Robert J Hoffberg
(74) *Attorney, Agent, or Firm* — Laurence A. Greenberg; Werner H. Stemer; Ralph E. Locher

(57) ABSTRACT

A multiphase switchgear includes a switch panel, a vertical input housing module and a vertical switch housing module. The switch housing module and the input housing module are spaced apart from one another by a transverse housing module. The input housing module, the transverse housing module and the switch housing module form a first phase block. A plurality of phase blocks are located flush one behind the other in the direction of the transverse housing.

15 Claims, 4 Drawing Sheets

(56) References Cited

U.S. PATENT DOCUMENTS

| | | | | |
|---|---|---|---|---|
| 4,503,481 A * | 3/1985 | Fujiya | ............... | H02B 5/06 361/612 |
| 4,774,628 A * | 9/1988 | Diaferia | ............. | H02B 1/22 218/78 |
| 4,862,319 A * | 8/1989 | Suzuyama | ............. | H02B 5/06 361/612 |
| 4,890,193 A * | 12/1989 | Tsubaki | ............. | H02B 5/06 361/612 |
| 5,373,415 A * | 12/1994 | Tawaratani | ............. | H02B 5/06 218/75 |
| 5,578,804 A * | 11/1996 | Berger | ............. | H02B 13/035 361/615 |
| 5,578,805 A * | 11/1996 | Berger | ............. | H02B 1/22 361/612 |
| 5,589,674 A * | 12/1996 | Berger | ............. | H02B 13/035 218/75 |
| 5,625,530 A * | 4/1997 | Inami | ............. | H02B 5/06 361/604 |
| 6,362,445 B1 * | 3/2002 | Marchand | ............. | H02B 13/0354 218/155 |
| 6,373,015 B1 * | 4/2002 | Marchand | ............. | H02B 13/0354 218/139 |
| 6,515,247 B1 | 2/2003 | Tsuzura et al. | | |
| 6,762,386 B2 * | 7/2004 | Itou | ............. | H02B 5/06 218/7 |
| 7,764,486 B2 * | 7/2010 | Otsuka | ............. | H02B 13/0352 218/69 |
| 7,835,140 B2 * | 11/2010 | Mori | ............. | H02B 5/06 361/612 |
| 7,911,770 B2 * | 3/2011 | Fujita | ............. | H02B 5/06 361/612 |
| 8,000,087 B2 * | 8/2011 | Fujita | ............. | H02B 5/06 218/69 |
| 8,228,665 B2 * | 7/2012 | Fujita | ............. | H02B 5/06 218/78 |
| 9,853,424 B2 * | 12/2017 | Ono | ............. | H02B 1/24 |

FOREIGN PATENT DOCUMENTS

| | | | | |
|---|---|---|---|---|
| EP | 0348312 A1 * | 12/1989 | ............. | H02B 1/22 |
| EP | 0875971 A2 | 11/1998 | | |
| FR | 2684246 A1 | 5/1993 | | |
| JP | S6135771 B2 * | 8/1986 | | |

\* cited by examiner ved from one
POLYPHASE SWITCHGEAR ASSEMBLY

BACKGROUND OF THE INVENTION

Field of the Invention

The invention relates to multiphase switchgear having a switch panel having a vertical input housing module that is connected to a vertical switch housing module via a transverse housing module, wherein the input housing module and the switch housing module are spaced from one another in the direction of the transverse housing module, and the input housing module, the transverse housing module and the switch housing module form a first phase block.

U.S. Pat. No. 4,774,628 discloses multiphase switchgear having a switch panel. The switch panel there has a vertical input housing module and a vertical switch housing module. The input housing module and the switch housing module are connected to one another via a transverse housing module and spaced from one another in the direction of the transverse housing module. The input housing module, the transverse housing module and the switch housing module form a first phase block. The known multiphase switch panel has a compact structure. It is thereby possible to position a multiplicity of switch panels next to one another, with the depth being limited. The compactness however also has the disadvantage that servicing and maintenance operations are able to be performed only with increased difficulty. In addition, the high degree of integration necessitates special operations and special housing modules, respectively, as a result of which production costs are increased unnecessarily.

SUMMARY OF THE INVENTION

The object of the invention that emerges is thus to specify multiphase switchgear having a switch panel, which switchgear, with compact dimensions, has an increased number of housing modules that are able to be used multiple times.

According to the invention, the object is achieved in the case of multiphase switchgear having a switch panel of the type mentioned at the outset in that a plurality of phase blocks are arranged situated in a row in the direction of the transverse housing.

A switch panel is a part of an electrical energy transmission device. Switchgear makes it possible to perform switching operations within an electrical energy transmission grid. As such, a switch panel has at least one breaker unit for an electrical switching device. A multiphase switch panel in this case serves for use in a multiphase electrical energy transmission system. A multiphase switch panel may for example transmit a three-phase electrical energy transmission system. It is thus known for example to use a three-phase AC voltage system, wherein the voltages vary temporally in each of the three phases, wherein there is a temporal offset within the three phases. In a three-phase electrical energy transmission system, all of the voltages of the respective phases at any time sum to give an absolute value of zero. By way of example, one of the phases may thus have a positive absolute value, whereas the other two phases have a negative absolute value that corresponds in sum form to the positive absolute value, but with an opposing mathematical sign.

A plurality of switch panels may be connected to one another, such that switchgear having a plurality of switch panels is formed. By virtue of juxtaposing a plurality of multiphase switch panels, a plurality of inputs of the respective switch panels are thus able in particular to be put into electrical contact with one another or disconnected from one another via a switch housing module. To this end, in each case a plurality of switch panels may be joined via what are called busbar housing modules. A busbar housing module may form an output on a phase block. Phase blocks of a plurality of switch panels may be connected to one another via a busbar housing module.

Multiphase switchgear or a switch panel may advantageously be provided with single-pole insulation. This means that each of the plurality of poles/phases is electrically insulated from the surroundings by insulation that performs an electrically insulating function regardless of the other insulation of the other poles/phases.

By way of example, the multiphase switchgear may be switchgear having fluid insulation, wherein the phase conductors are washed around in each case separately by an electrically insulating fluid. The electrically insulating fluid insulates the respectively washed-around pole/phase conductor of the multiphase switchgear. In order to avoid evaporation of the electrically insulating fluid, the switchgear may have an encapsulating housing that encloses the electrically insulating fluid. In this case, each of the phase conductors of the respective phase/of the respective pole (that is to say the electrically conductive elements that are operated in each case at the same electrical potential) is washed around by a volume of fluid that is separated from the volumes of fluid of the other remaining phases/poles. For separation purposes, the phase conductors may each be accommodated in a separate housing module of the encapsulating housing. There may advantageously be provision in this case for structurally identical housing modules to be used for different phases/poles in a multiphase design of a switch panel. The electrically insulating fluid may be present in gaseous and/or liquid form.

A housing module is in this case typically provided with a hollow cylindrical base structure and has a longitudinal axis that corresponds substantially to the hollow cylinder axis or is aligned parallel to the hollow cylinder axis. A housing module preferably has at least one interface in order to be able to be connected to further housing modules. Such an interface may preferably be designed in the form of a flange, such that reversible connection of different flanges of different housing modules is in particular made possible. The interfaces are in this case preferably also used to guide phase conductors that are arranged inside a housing module into or out of the respective housing module or to allow them to pass into other housing modules. The phase conductors should in this case be supported in a manner electrically insulated from the housing module. Support may preferably be provided in the region of the flanges of the respective housing module. By way of example, a support insulator may be inserted into a flange connection between two housing modules, such that the phase conductor is able to pass through the interface as centrally as possible. In particular when using circular flanges, a phase conductor may be positioned centrally in the flange. A support insulator may for example have a disk shape that is shaped in a manner corresponding to the cross section of the respective interfaces. When using a circular flange, the support insulator may have a corresponding circular surface and be inserted into a flange connection, wherein the flanges are connected to one another with the interposition of the support insulator. A fluidtight closure of the respective housing module may be provided in the region of the interface. In this case, the fluidtight closure may be designed such that the phase conductor is routed through this fluidtight barrier in an electrically insulated manner. To this end, use may be made for example of disk-shaped support insulators that straddle an interface, in particular a flange, in a fluidtight manner and close off the flange surface in a fluidtight manner. There may however also be provision, in the flanged state of two housing modules, for electrically insulating fluid, in particular insulating gas, to be allowed to be transferred through the flange connection between the individual housing modules. To this end, a corresponding channel may be provided for example in the phase conductor or in a support insulator.

The arrangement of corresponding interfaces, in particular of flanges, on a housing module should preferably be provided on an end face. There may however also be provision for an interface to be arranged on a side face in order to connect further assemblies to the respective housing module. A housing module in each case comprises a housing that is able to delimit an electrically insulating fluid inside it, and also a phase conductor that is arranged at least in sections inside the housing module and that is able to be electrically insulated by way of the electrically insulating fluid. Examples of suitable electrically insulating fluids are fluorine-containing media such as sulfur hexafluoride, fluoronitrile, fluoroketone, etc. It is also however possible to use nitrogen-containing and oxygen-containing media. If necessary, the insulating medium may be present in gaseous form inside the respective housing modules. There may however also be provision for at least parts of the insulating medium to be present in a liquefied form within a housing module. The media present inside the respective housing module may preferably also be subjected to overpressure in order to accordingly increase the insulation resistance of the insulating medium.

Arranging a plurality of phase blocks in a row in the direction of the transverse housing furthermore provides the possibility of prefabricating a multiphase switch panel in a modular manner, that is to say aligning the plurality of phase blocks with respect to one another in a row and in an angularly fixed manner in the direction of the transverse axis. When a plurality of phase blocks are placed in a row, these follow one another in the direction of the transverse axis of the transverse housing. As an alternative, there may also be provision for the same phase blocks of a plurality of switch panels of switchgear, these being arranged parallel to one another, to each be combined to form an assembled unit, such that in each case identical phase blocks of a first and of a second switch panel are connected to one another in an angularly fixed manner and are able to be shipped as an assembled unit. The phase blocks of a switch panel, which each serve to transmit different phases, may preferably be designed identically. A high degree of prefabrication is thereby able to be achieved. Hollow cylinder axes of the switch housing module and of the input housing module preferably extend parallel to one another in a vertical direction. The transverse housing module forms a bridge. The transverse housing module may preferably be connected (for example flanged) in each case to the switch housing module and the input housing module on a side face (possibly via a knee or intersecting component). The input housing module forms access to the respective pole/phase of the switch panel. The switch housing module serves to switch the input housing module and to join a plurality of switch panels of switchgear. By switching the input housing module, the entire phase block is able to be activated or deactivated. Cables, overhead lines, etc. may for example be connected at the input housing module. The switch panels of switchgear may be joined by way of a busbar module. To this end, a busbar module may be connected to the switch housing module. The switch module may thus form an output of the phase block via a busbar module.

A further advantageous refinement may make provision for the phase blocks to have a substantially identical construction.

A phase block in each case offers the possibility of performing a particular switching operation or a current distribution in one phase of a multiphase system. A plurality of phase blocks may be combined in the form of a switch panel, such that switching operations or a current distribution are able to be performed synchronously in all phases. In the case of using a multiphase electrical energy transmission system, each of the phase blocks may serve to switch or transmit the phases of the electrical energy transmission system. By virtue of using substantially identically constructed phase blocks, it is possible to perform synchronous or matched switching or transmission of the phases in the respective phase blocks. Identical input housing modules, transverse housing modules and switch housing modules may furthermore be used to construct the phase blocks, for example. Further housing modules may furthermore also have an identical construction. By way of example, current converter housing modules, voltage converter housing modules, circuit breaker housing modules, grounding switch housing modules, busbar housing modules etc. on the individual phase blocks may be designed identically.

There may furthermore advantageously be provision for a plurality of phase blocks to be arranged parallel to the transverse housing.

In addition to an arrangement of a plurality of phase blocks in a row in the direction of the transverse housing in a multiphase switch panel, there may be provision for a plurality of phase blocks to be arranged parallel to the transverse housing. A plurality of switch panels may thus in particular be arranged parallel to the transverse housing, wherein the respective phase blocks are arranged parallel to one another. In this case, the phase blocks of the respectively same phase of the multiphase switchgear are preferably arranged in a manner situated directly adjacent to one another. A switchgear switch panel having a substantially rectangular footprint is thereby able to be constructed, this having in each case a plurality of phase blocks in a row both parallel to the transverse housing and in the direction of the transverse housing. The phase blocks of the respective switch panel, which phase blocks are arranged situated in a row in the direction of the transverse housing, may in particular be designed identically.

A further advantageous refinement may make provision for a busbar housing module to be arranged on an end face of the switch housing module, in particular in a manner covered by the switch housing module.

A switch housing module is advantageously aligned substantially in a vertical direction, wherein the vertical alignment relates to a hollow cylinder axis of a switch housing module. The switch housing module receives inside it a breaker unit for (a phase/a pole of) an electrical switching device. This electrical switching device preferably has switching contact parts able to move in relation to one another, wherein a relative movement needs to be generated between the switching contact parts. In the case of a multiphase design of the switching device, the breaker units are distributed among a plurality of phase blocks of a switch panel (for example situated in a row in the direction of the transverse housing module).

In order to achieve a corresponding distribution of a supplied and dissipated electrical energy via an input housing module to the switch housing module between different switch panels, phase blocks arranged parallel to the transverse housing may be joined by way of a busbar housing module. It is thus possible to distribute or divide an energy flow between different switch panels of multiphase switchgear via a busbar housing module. The busbar housing module to this end preferably has a phase conductor (busbar) that is aligned transverse to the plurality of phase conductor blocks, situated in a row, of a switch panel. In this case, the phase conductors are accommodated within a busbar housing of the busbar housing module and mounted there in a manner electrically insulated by an electrically insulating medium, in particular a fluid. A busbar housing module may accordingly have an interface (flange), such that the busbar housing module is able to be connected to various further housing modules. Arranging a busbar housing module on an end face of a switch housing module makes it possible to achieve efficient usage of the installation space on the switch housing module. On the one hand, this thus affords the possibility of positioning the busbar housing module on an end face, for example in a manner covered by the switch housing module. In the case of a vertical configuration, the busbar housing module may be positioned only at least partly underneath the switch housing module. Further components, such as for example drive devices, may accordingly be positioned at more suitable positions on the switch housing module. The busbar housing module is thus mounted in a low-lying position on multiphase switchgear.

A further advantageous refinement may make provision for a busbar housing module to be arranged on a side face of the switch housing module.

Positioning a busbar housing module on a side face of the switch housing module makes it possible to form what is called a double busbar. That is to say, it is possible to selectively alternately or simultaneously distribute a current path among a first busbar housing module and a second busbar housing module at an output-side end of the switch housing module or on a side of the breaker unit arranged in the switch housing module. In this case, at least one of the busbar housing modules may be mounted on an end face and the other busbar housing module may be mounted on a side face of the switch housing module. The busbar housing modules may in this case be positioned on the switch housing module directly, that is to say for example through direct flanging of switch housing module and busbar housing module. There may however also be provision for the busbar housing module and switch housing module to be joined indirectly. By way of example, there may thus be provision to interpose for example a knee or an angular ground conductor, etc., between the housing modules on a side face. A side-face arrangement of a busbar housing module also furthermore in particular makes it possible, in the case of indirect flanging via a housing module with a branch, to position a third busbar housing module on a switch housing module, such that what is called a triple busbar may be formed. One busbar housing module may accordingly be flanged on the end face of the switch housing module and the other two busbar modules may be flanged on a side face thereof, such that busbar housing modules arranged on side faces, for example below the transverse housing, are bridged by the transverse housing.

This thus ensures efficient usage of the installation space on a switch panel. When using a side-face arrangement of a busbar housing module as well, this may be positioned such that the transverse housing straddles the busbar housing module.

A further advantageous refinement may make provision for a drive device to be arranged on a front-side switch housing module, wherein the drive device is coupled to breaker units of switch housing modules situated in a row in the direction of the transverse housing.

The phase blocks situated in a row, due to their axially identical alignment of the transverse housing, are divided, in the case of for example three-phase switchgear, into a front-side switch housing module and a rear-side switch housing module, giving rise to a front-side phase block and a rear-side phase block, wherein a middle phase block is arranged between the front-side and rear-side phase block. This accordingly results in a front-side switch housing module that has an associated drive device. The drive device in this case serves to generate a relative movement between switching contact parts of the breaker units of the switch housing modules. The breaker units are positioned within the switch housing modules and are arranged there in an electrically insulated manner. A breaker unit provides for disconnection or formation of a current path within a phase conductor line, here within a phase conductor line of the respective phase of the respective phase block. A drive device may serve to drive a plurality of breaker units, in particular a plurality of functionally identical breaker units in different phase blocks. Corresponding coupling may be achieved through a kinematic chain.

There may however also be provision for a separate drive device to be assigned in each case to a breaker unit (single-pole drives).

In order to generate the relative movement of switching contact parts able to move in relation to one another of a breaker unit of a switch housing module, provision is made for a drive device that provides a corresponding drive energy. In order to ensure that the breaker units of the phase blocks situated in a row in the direction of the transverse housing or switch housing modules are able to perform a matched synchronized movement, the drive device, which is arranged on the front-side switch housing module, may also be intended to couple a movement onto the breaker units of the switch housing modules situated in a row in the direction of the transverse housing. The drive device is in this case able to be mounted easily on account of the front-side positioning and is easily accessible in the event of maintenance. The breaker units may be connected to the drive device preferably via a rod or another kinematic chain that transmits a switching movement to the individual switch housing modules of the phase blocks substantially in the direction of the transverse housing. The kinematic chain serving to transmit the movement may be inserted into the switch housing module at an end face or at a side face.

There may furthermore advantageously be provision for a drive device to be arranged on a front-side switch housing module and to at least partially cover the switch housing module.

There should be partial coverage at an end face of the switch housing module. In the case of a vertical alignment of the switch housing module, the drive device may preferably be positioned above the switch housing module and at least partially cover the switch housing module there. The drive device thereby provides mechanical protection for the switch housing module situated underneath. On the other hand, the other (for example lower) side of the switch housing module is exposed, in order for example to position busbar housing modules for a single, double or triple busbar configuration there. The compactness of the multiphase switchgear may accordingly be further increased. Simplified accessibility to the drive device is also made possible, and it becomes more readily possible to couple a movement onto switching contact parts to be driven.

A further advantageous refinement may make provision for a grounding switch module, which is straddled by the transverse housing module, to be arranged on the switch housing module and/or on the transverse housing module and/or on the input housing module.

A grounding switch module serves to apply ground potential to a phase conductor that is positioned inside a switch housing module and/or an input housing module and/or another housing module. To this end, a movable switching contact part, which may for example permanently channel ground potential, is put into electrical contact within the switch housing or the input housing with the phase conductor positioned there, such that the respective phase conductor in the switch housing or in the input housing is able to be grounded. A grounding switch module may to this end preferably be positioned on a side face of the switch housing module and/or of the input housing module. In this case, the movement axis of a movable switching contact part of a grounding switch module is preferably aligned parallel to the direction of the transverse housing. When using a grounding switch module, the grounding switch modules may preferably be arranged flush situated in a row in the direction of the transverse housing, both on the switch housing module and on the input housing module. There may in this case in particular be provision for this to be flush with the opposite direction.

This thereby creates the possibility of positioning both a grounding switch module for the switch housing and for the input housing in the region straddled by the transverse housing module. The region that is used when arranging a side-face busbar housing module is thus for example also used to position the grounding switch modules. A switch panel that should have a narrow structure is thereby able to be produced, which receives required attachment parts when bridged by the transverse housing. A grounding switch module may for example be positioned on the switch housing module or input housing module via a side-face flange, and in this case have a relatively movable switching contact part within the electrically insulating fluid enclosed by the switch housing module or input housing module.

There may furthermore advantageously be provision for a grounding switch module, which extends above the transverse housing module, to be arranged on the switch housing module and/or on the input housing module and/or on the transverse housing module.

A position for a grounding switch module may also be provided on the switch housing module and/or on the input housing module and/or on the transverse housing module, wherein the transverse housing module extends below the grounding switch module. In this case, the grounding switch module straddles the transverse housing module. This has the advantage that the position of the grounding possibilities is able to be defined for example close to a circuit breaker via the respective grounding switch module. Mechanical effects, as occur for example when switching a grounding switch module, may thereby be kept away from more mechanically vulnerable components. The space situated on the respective phase block may furthermore be used expediently by keeping the installation space underneath the transverse housing module(s) free. It is thereby for example possible to use for example three busbar housing modules that are able to form what is called a triple busbar.

A further advantageous refinement may make provision for a grounding switch module, which extends in the plane of the transverse housing module, to be arranged on the switch housing module and/or on the input housing module and/or on the transverse housing module.

The transverse housing module spaces the input housing module and the switch housing module from one another and defines a transverse axis in which a plurality of phase blocks may be situated in a row. By positioning the grounding switch module in the same plane as the transverse housing, adjacent installation space on the transverse housing module or flush installation space in the direction of the successive phase blocks may for example serve to receive a grounding switch module. The transverse housing module and the grounding switch module are situated in one plane.

A further advantageous refinement may make provision for a breaker unit to form a switching path of a power switch.

A breaker unit may form a switching path of a power switch. A switching path of a power switch is arranged for example within a switch housing module. This thereby creates the possibility of using the breaker unit to interrupt or connect a current path of a phase block between an input housing module and in particular an output of a power switch of a switch housing module, for example formed by a busbar housing module. A power switch in this case serves to switch nominal and short-circuit currents. Self-blowing breaker units or else vacuum interrupters may be used as breaker unit of a power switch, for example.

A further advantageous refinement may make provision for a breaker unit to form a switching path of a circuit breaker.

A circuit breaker serves for current-free switching of a phase conductor. A circuit breaker is preferably used as a safety element in order for example to prevent undesired activation within a phase block in the event of failure of a power switch. A circuit breaker may in this case switch currents to a limited extent, these occurring for example due to the appearances of charge.

A circuit breaker may for example be provided at an output of a switch housing module. It is thereby made possible for example to use a circuit breaker, which is positioned on a busbar housing module or upstream of a busbar housing module, to activate a busbar housing module on a switch housing module. Through alternately selecting a circuit breaker in the case of single, double or triple busbars, it is possible to distribute/change over an output side of a breaker unit on the switch housing module.

A circuit breaker may furthermore also be positioned in the input housing module so as to disconnect the input housing module from the input side of the switch housing module (where the transverse housing module connects the switch housing module to the input housing module), as a result of which it is possible to achieve safe switching, for example of a cable or an overhead line connected to the input housing module.

A further advantageous refinement may make provision for a breaker unit to form a switching path of a grounding switch.

A grounding switch may serve to apply ground potential to activated phase conductors. In order to be able to achieve this in a compact and reliable manner, a switching path of a grounding switch should preferably be arranged at the appropriate positions, for example upstream and downstream of a switching path of a power switch or upstream or downstream of a switching path of a circuit breaker. Grounding switch modules that need to be flanged in particular on a side face and that are necessarily arranged on the respective housing modules of a phase block are suitable for this purpose.

A grounding switch may have a breaker unit having a switching contact part able to move in relation to a phase conductor to be grounded, which switching contact part for example permanently channels ground potential, and, when inserted for example into a connector, a contact connector of a phase conductor likewise applies ground potential to this phase conductor.

A further advantageous refinement may make provision for housing modules to be connected to one another directly or indirectly via interfaces, in particular flanges.

Individual housing modules are able to be connected to one another via interfaces. This thereby creates the possibility of achieving a modular construction of multiphase switchgear and in the process of using a multiplicity of identical housing modules. Flanges having screw connections are in particular preferably suitable as interfaces, such that repeated opening and closing of the interfaces is made possible. The flanges may also be used to support phase conductors that are to be positioned in an electrically insulated manner inside the respective housing modules. To this end, disk-shaped insulators may for example be arranged in the flange join between two interfaces of two housing modules. The interfaces may also be used to form a fluidtight barrier on a housing module, such that the respective housing module is able to hermetically enclose an electrically insulating fluid inside it.

A further advantageous refinement may make provision for switch panels to be spaced from one another in the direction of the depth axis via interfaces. To this end, what are called busbar distancing modules may be inserted through the busbar modules, these being arranged between flanges. This thereby spaces the individual switch panels, as a result of which it is made possible to access the switch panels even between the switch panels. There may preferably be provision for each second switch panel to be spaced from an adjacent switch panel using busbar distancing modules. The busbar distancing modules allow a fluidtight join between the interfaces and electrically insulated guidance of the phase conductors of the respective busbar modules.

One exemplary embodiment of the invention is shown schematically in a drawing and described in more detail below.

DETAILED DESCRIPTION OF THE INVENTION

Figure 1:
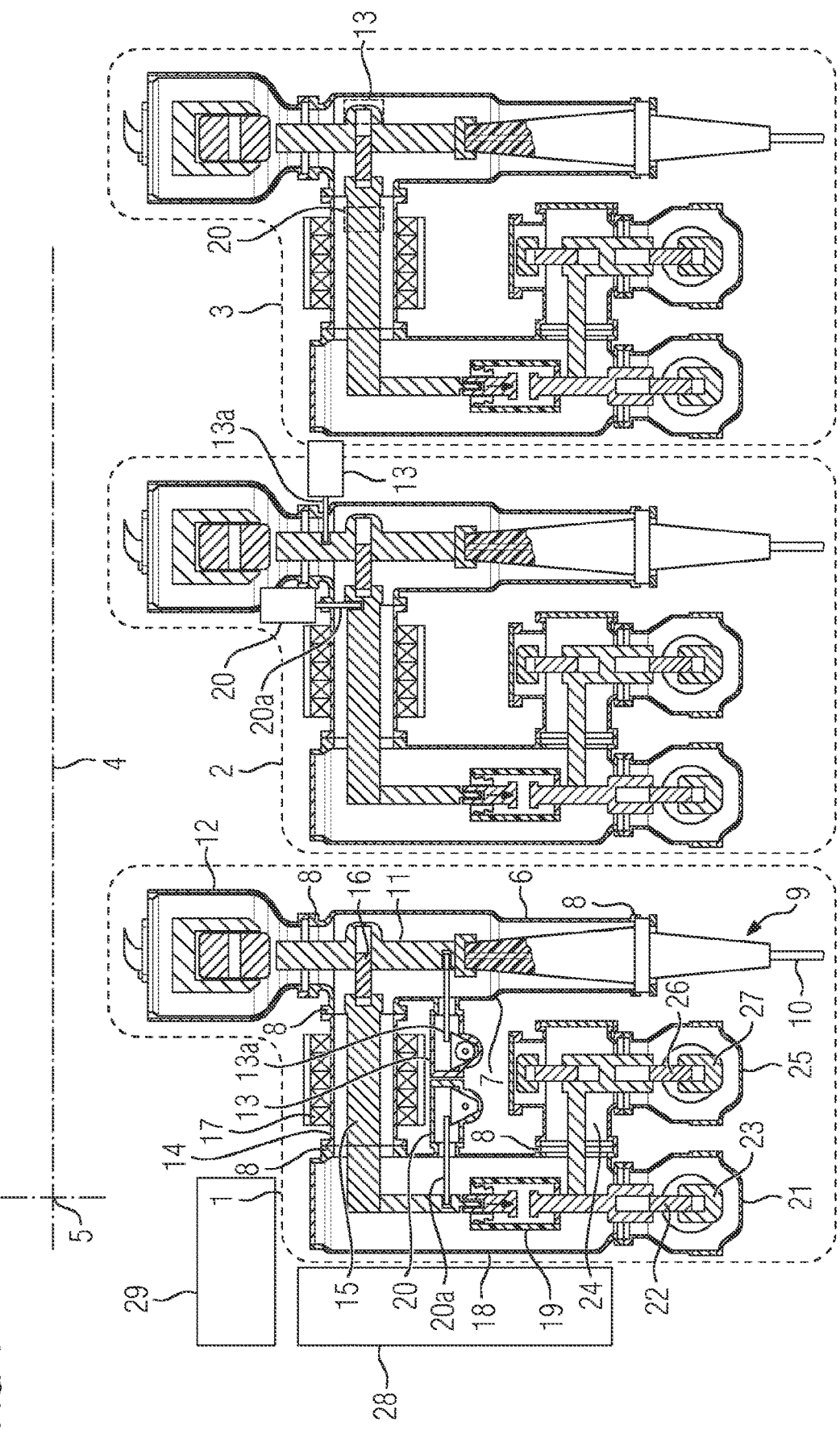
FIG. 1 shows a cross section through a switch panel of multiphase switchgear.

FIG. 1 shows a cross-sectional side view of a switch panel of multiphase switchgear. In this case, the switch panel has a first phase block 1, a second phase block 2 and a third phase block 3. The three phase blocks 1, 2, 3 are each constructed identically and are aligned flush in a row in a direction of a transverse axis 4. A depth axis 5 is arranged plumb to the transverse axis 4. A plurality of switch panels may be arranged aligned substantially parallel to one another in a row in the direction of the depth axis 5 (cf. FIG. 4). The first phase block 1 forms a front-side phase block. The third phase block 3 forms an end-side phase block. The second phase block 2 is arranged between the front-side first phase block 1 and end-side third phase block 3.

The structure of a phase block as shown in FIG. 1 is now described by way of example first of all with reference to the first phase block 1. The first phase block 1 has a vertical input housing module 6. The vertical input housing module 6 has an input housing 7. The input housing 7 has a substantially hollow cylindrical form, wherein the hollow cylinder axis is aligned in a vertical direction. The input housing 6 in this case has cross sections of various types. On the end face, the input housing 7 is provided in each case with a flange 8. A cable connection 9 is arranged on the input-side end of the input housing 7. The cable connection 9 introduces a cable 10 into the inside of the input housing 7. The cable connection 9 is in this case connected to the flange 8 of the input housing 7 in a fluidtight manner and closes off the flange 8 and thus the input housing 7 in a fluidtight manner. A phase conductor 11 adjoins the cable connection 9 inside the input housing module 6. The phase conductor 11 is in this case guided starting from the cable connection 9 in a vertical direction through the flange 8 there to a voltage converter housing module 12. The voltage converter housing module 12 closes off the end-side flange 8 there in a fluidtight manner. A voltage converter is arranged inside the voltage converter housing module 12 and measures and converts electric voltages on the phase conductor 11 that is positioned inside the vertical input housing module 6. On the side face, a first grounding switch module 13 is arranged level with the transition from the cable connection 9 to the phase conductor 11 of the vertical input housing module 6. The first grounding switch module 13 is flanged on the side face of the input housing 7, wherein the corresponding flange support is closed off in a fluidtight manner by the first grounding switch module 13. A movable switching contact part 13a of the first grounding switch module 13 is mounted inside the input housing 7. The movable switching contact part 13a of the first grounding switch module 13 permanently channels ground potential. Depending on the switching state of the first grounding switch module 13, the movable switching contact part 13a is inserted into a contact connector of the phase conductor 11 of the vertical input housing module 6 or spaced therefrom in an electrically insulated manner. The phase conductor 11 of the vertical input housing module 6, and thus the cable connection 9 as well as the cable 10, may accordingly be grounded by the first grounding switch module 13. A side-face flange 8 is furthermore positioned on the input housing 7. A transverse housing module 14 is flanged flush via the side-face flange 8 in the direction of the transverse axis 4. A phase conductor 15 is arranged inside the transverse housing module 14. The phase conductor 15 is able to be electrically conductively contacted via what is called a cable disconnector 16, which switches the transition from the phase conductor 11 of the vertical input housing module 6 to the phase conductor 15 of the transverse housing module 14. The cable disconnector 16 to this end has a movable switching contact part that makes it possible to disconnect or create contact between the phase conductors 11, 15 of the vertical input housing module 6 and of the transverse housing module 14. The transverse housing module 14 has a substantially tubular rotationally symmetrical transverse housing. The transverse housing is in this case flush or parallel with the transverse axis 4. In the present case, the transverse housing module 14 is intended to carry a current converter in order to measure the current flow through the phase conductor 15 of the transverse housing module 14. To this end, measuring cores 17 are placed on the outer side face of the transverse housing of the transverse housing module 14. This thus forms what is called an external converter, since the measuring cores are situated in the surroundings, that is to say outside the space delimited by the transverse housing of the transverse housing module 14.

The vertical input housing module 6 is connected to a vertical switch housing module 18 via the transverse housing module 14. The vertical switch housing module 18 has a switch housing that is designed to be substantially hollow cylindrical or rotationally symmetrical, wherein the axis of rotation or hollow cylinder axis is aligned in a vertical direction. There is provision for the switch housing of the vertical switch housing module 18 to be flanged to the transverse housing module 14 via a flange 8 on the side face. The transverse housing module 14 thereby connects the input housing module 6 to the switch housing module 18. The switch housing module 18 and the input housing module 6 are spaced from one another by the transverse housing 14, wherein the switch housing module 18 and the vertical input housing module 6 are aligned flush to one another, wherein the axes of rotation or hollow cylinder axes are arranged parallel. The transverse housing module 14 runs in the direction of the transverse axis 4. The three phase blocks 1, 2, 3 are also aligned flush in a row in the direction of the transverse axis 4.

A breaker unit 19 of a power switch is arranged inside the vertical switch housing module 18. In the present case, the breaker unit 19 of the power switch is designed as a vacuum interrupter, inside which switching contact parts able to move in relation to one another form a switching path. On the input side, the breaker unit 19 of the power switch inside the switch housing module 18 is permanently electrically conductively connected to the phase conductor 15 of the transverse housing module 14. This input side may also have ground potential applied thereto via a second grounding switch module 20. In the same way as for the first grounding switch module 13, the second grounding switch module 20 has a movable switching contact part 20a. The first and the second grounding switch module 13, 20 are in this case aligned flush with one another in the direction of the transverse axis 4, wherein the movable switching contact parts 13a, 20a bear away from one another in opposing directions. The movable switching contact part 20a inside the vertical switch housing module 18 is able to be inserted into a contact connector of the phase conductor there on the input side of the breaker unit 19 or is able to be electrically insulated therefrom, such that the phase conductor 15 of the transverse housing module 14 is also able to be grounded by the second grounding switch module 20.

In FIG. 1, in the first phase block 1, the first grounding switch module 13 and the second grounding switch module 20 are positioned such that the grounding switch modules 13, 20 are straddled by the transverse housing module. Alternative positionings of first and second grounding switch modules 13, 20 are shown on the second phase block 2 and on the third phase block 3 in FIG. 1. In electrical terms, in all three phase blocks 1, 2, 3, the same phase conductors are able to have ground potential applied thereto via the first or second grounding switch module 13, 20. Only the location or the position at which ground potential is coupled in varies.

By way of example, on the second phase block 2, the first grounding switch module 13 and second grounding switch module 20 are positioned such that they are positioned on the transverse housing module 14 or on the input housing module 6 such that they are arranged above the plane of the transverse housing module 14. The space straddled by the transverse housing module 14 is thereby kept free from the grounding switch modules 13, 20 (cf. difference in FIG. 1, first phase block 1, second phase block 2). In this case, the grounding switch modules 13, 20 are positioned such that the movement paths of the movable switching contact parts 13a, 20a are substantially plumb to one another.

In the third phase block 3 in FIG. 1, a broken line indicates where further mounting of a first or second grounding switch module 13, 20 is possible. On the third phase block 3, the position of the first or second grounding switch module 13, 20 is selected such that they are positioned situated in the plane of the transverse housing module 14. That is to say, in this case, the grounding switch modules 13, 20, illustrated by a broken line, of the third phase block 3 protrude out of the plane of the drawing for the observer and, together with the transverse housing module 14, span one plane. There is advantageously provision in this case for the movement axes of the movable switching contact parts 13a, 20a of the two grounding switch modules 13, 20 to be aligned substantially parallel to one another. The movement axes of the movable switching contact parts 13a, 20a are in this case oriented substantially parallel to the depth axis 5.

On the output side, a first busbar housing module 21 is arranged on the end face of the switch housing of the vertical switch housing module 18. The first busbar housing module 21 has a busbar housing that has a first busbar disconnector 22 starting from the output side of the breaker unit 19 of the power switch. The first busbar 23 running inside the first busbar module 21 is able to be put into electrical contact with the output side of the breaker unit 19 of the power switch via the first busbar disconnector 22. The first busbar disconnector 22 to this end has a relatively movable disconnector switching contact part.

On the side face, a flange 8 is arranged on the output of the breaker unit 19 of the power switch on the switch housing of the switch housing module 18, to which flange a second busbar module 25 is able to be electrically connected indirectly to the output side of the breaker unit 19 of the power switch via an angular grounding module 24. The busbar of the second busbar module 25 is able to be put into electrical contact if necessary with the output side of the breaker unit 19 of the power switch via a second busbar disconnector 26 of the second busbar module 25 with a corresponding movable switching contact part. The busbar disconnectors 22, 26 thus allow mutual or parallel contact between the busbars 23, 27 and the output side of the breaker unit 19 of the power switch. The output side of the breaker unit 19 of the power switch is able to have ground potential applied thereto by the angular grounding module 24, via a movable grounding contact part of the angular grounding conductor there. By virtue of the corresponding interconnection, depending on the switching state of the two busbar disconnectors 22, 26, the first busbar 23 and/or the second busbar 27 are thereby also able to be grounded.

The first phase block 1 has what is called single-pole (single-phase) insulation. In each case just one phase conductor (one pole) is arranged inside the individual housing modules and serves to transmit one phase of a three-phase electrical energy transmission system. The electrically insulating fluid arranged in each case inside the housing modules preferably serves only to electrically insulate one and the same phase conductor within the respective housing module. If necessary, the individual housings may be separated from one another by fluidtight barriers that are arranged in particular in the region of the flanges 8. Disk-shaped insulators inserted into the flanges may for example serve as fluidtight barriers, these being passed through in each case in a preferably fluidtight manner by the phase conductor. As an alternative or in addition to single-pole insulation, housing modules may also serve for multi-pole insulation of phase conductors. In this case, an electrically insulating fluid enclosed inside a housing module insulates and washes around a plurality of phase conductors that channel electrical potentials that differ from one another.

The construction of the first phase block 1 has been described by way of example on the basis of said first phase block. The second phase conductor block 2 and the third phase conductor block 3 have an identical structure. In this case, each of the corresponding cables 10 has another electrical phase applied thereto, such that a different voltage prevails in each of the phase blocks 1, 2, 3 of one and the same electrical energy transmission system.

An on-site control cabinet 28 is arranged on the first phase block 1, here the front-side phase block. The on-site control cabinet 28 is in this case arranged flush in the direction of the transverse axis on the side face upstream of the vertical switch housing module 18 of the first phase block 1. The on-site control cabinet 28 may for example accommodate control devices, measuring devices, regulation devices, etc.

A drive device 29 is furthermore arranged on the first phase block 1 in a manner covering the end face of the switch housing of the vertical switch housing module 18. The drive device 29 serves to drive the switching contact parts able to move in relation to one another of the breaker units 19 of the power switch that are positioned inside the switch housing of the vertical switch housing modules 18. The drive device 29 may preferably also be connected to the breaker units 19 of the second and third phase block 2, 3 by way of a kinematic chain in order to transmit a drive energy.

In the same way as for using a common drive device 29 for all of the breaker units 19 of the individual phases of the power switch within the first, second and third phase block 1, 2, 3, central drive devices 29, 29*a*, 29*b* may be used for the in each case functionally identical breaker units (power switch, grounding switch, circuit breaker), each of which are used via respective kinematic chains that run substantially in the direction of the transverse axis and connect the first phase block 1, the second phase block 2 and the third phase block 3 to one another.

Figure 2:
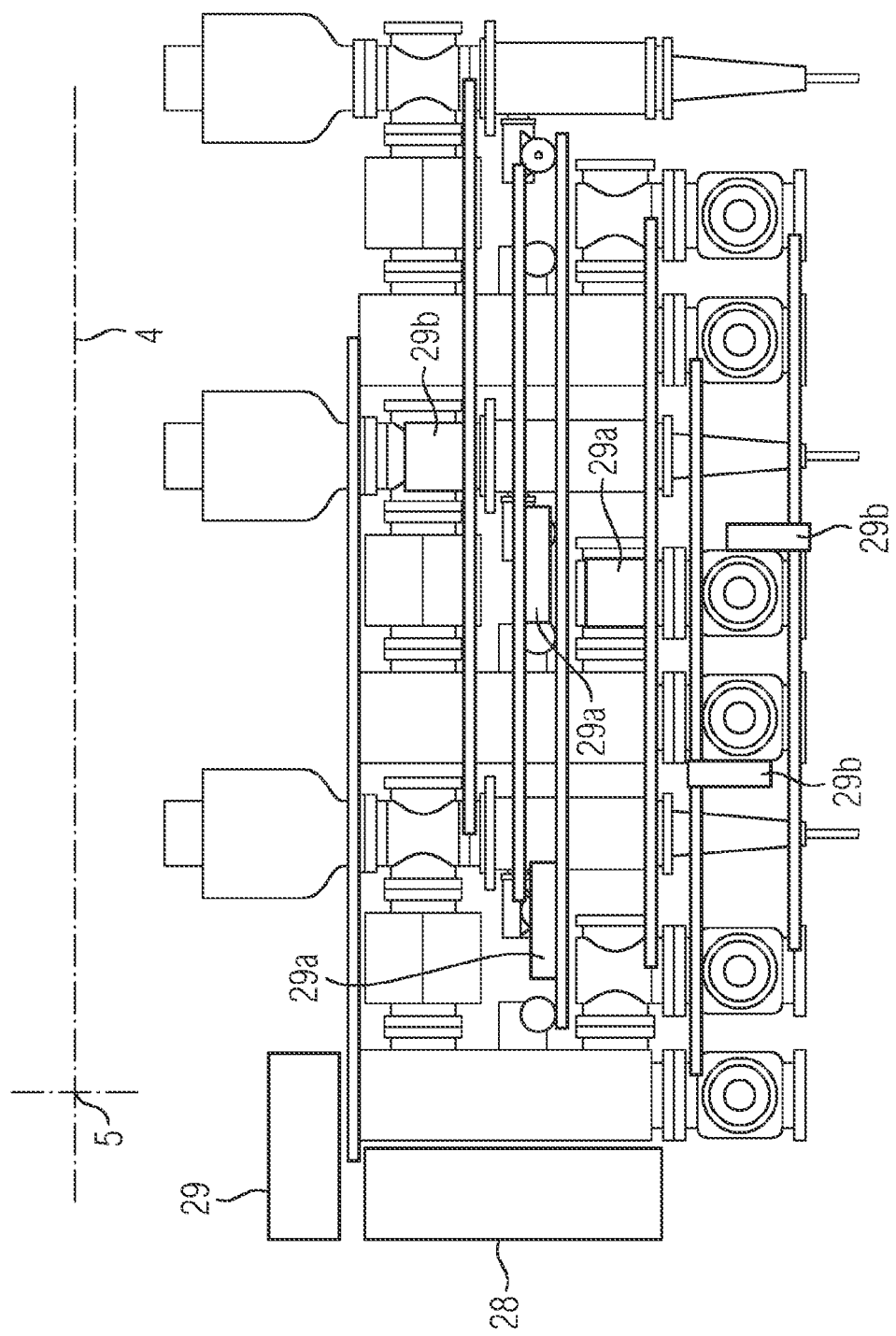
FIG. 2 shows a side view of the switch panel known from FIG. 1.

FIG. 2 shows a side view of the switch panel known from FIG. 1, wherein in each case a connection of a drive device 29, 29*a*, 29*b* to the functionally identical breaker units of the power switch, breaker units of the circuit breakers, breaker units of the grounding switches run in each case via corresponding kinematic chains that run substantially in the direction of the transverse axis 4. FIG. 2 then also shows a possible transport configuration of a switch panel. If necessary, the voltage converter housing modules 12 may be dismantled for transportation in order to reduce the height of the switch panel.

Figure 3:
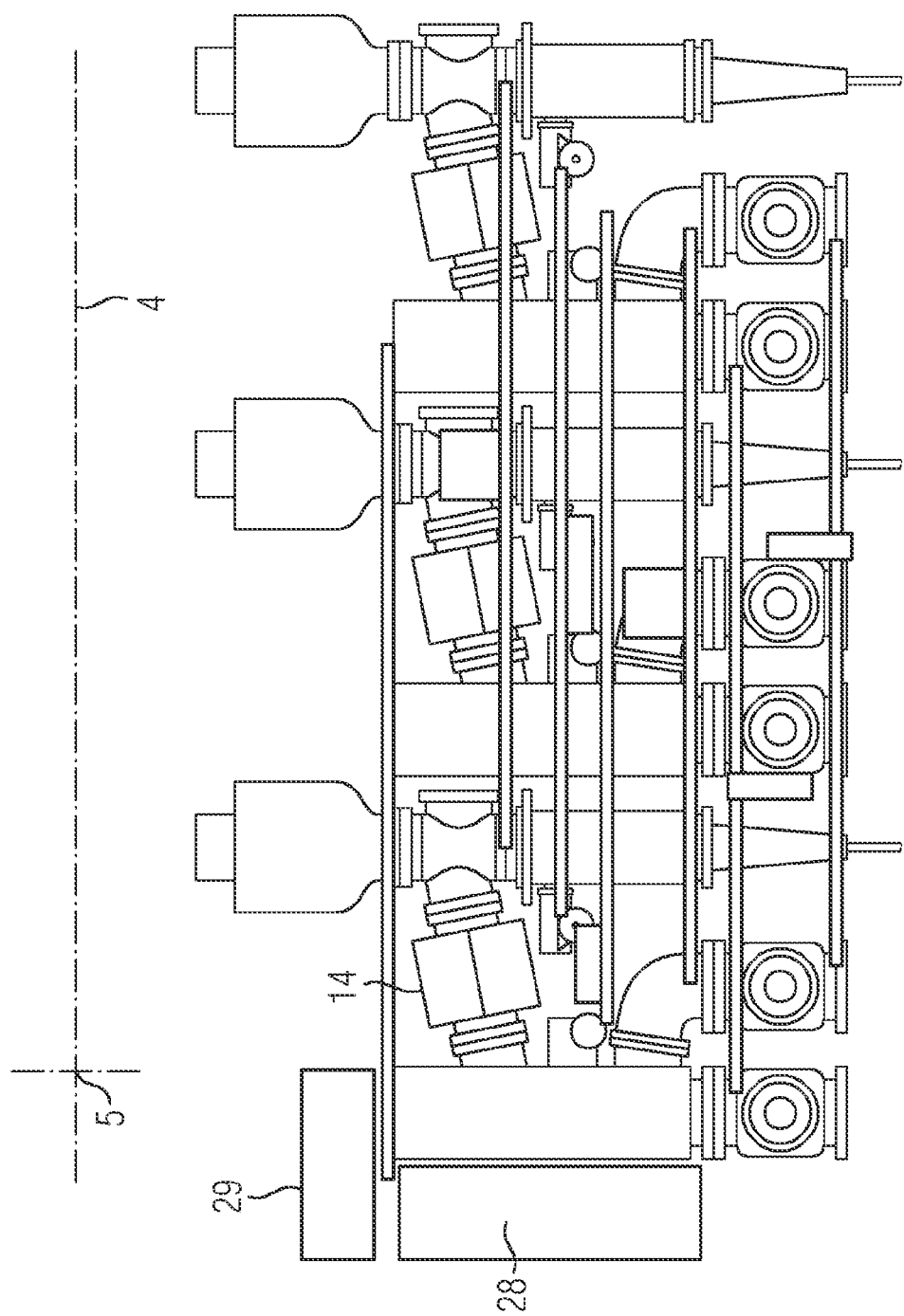
FIG. 3 shows a side view of a modified switch panel.

FIG. 3 shows a deviation from the switch panel, known from FIGS. 1 and 2, of multiphase switchgear. A description is given there of the use of obliquely arranged supports or transverse housing modules 14, as a result of which a shorter construction of the switch panel is made possible in the direction of the transverse axis 4.

Figure 4:
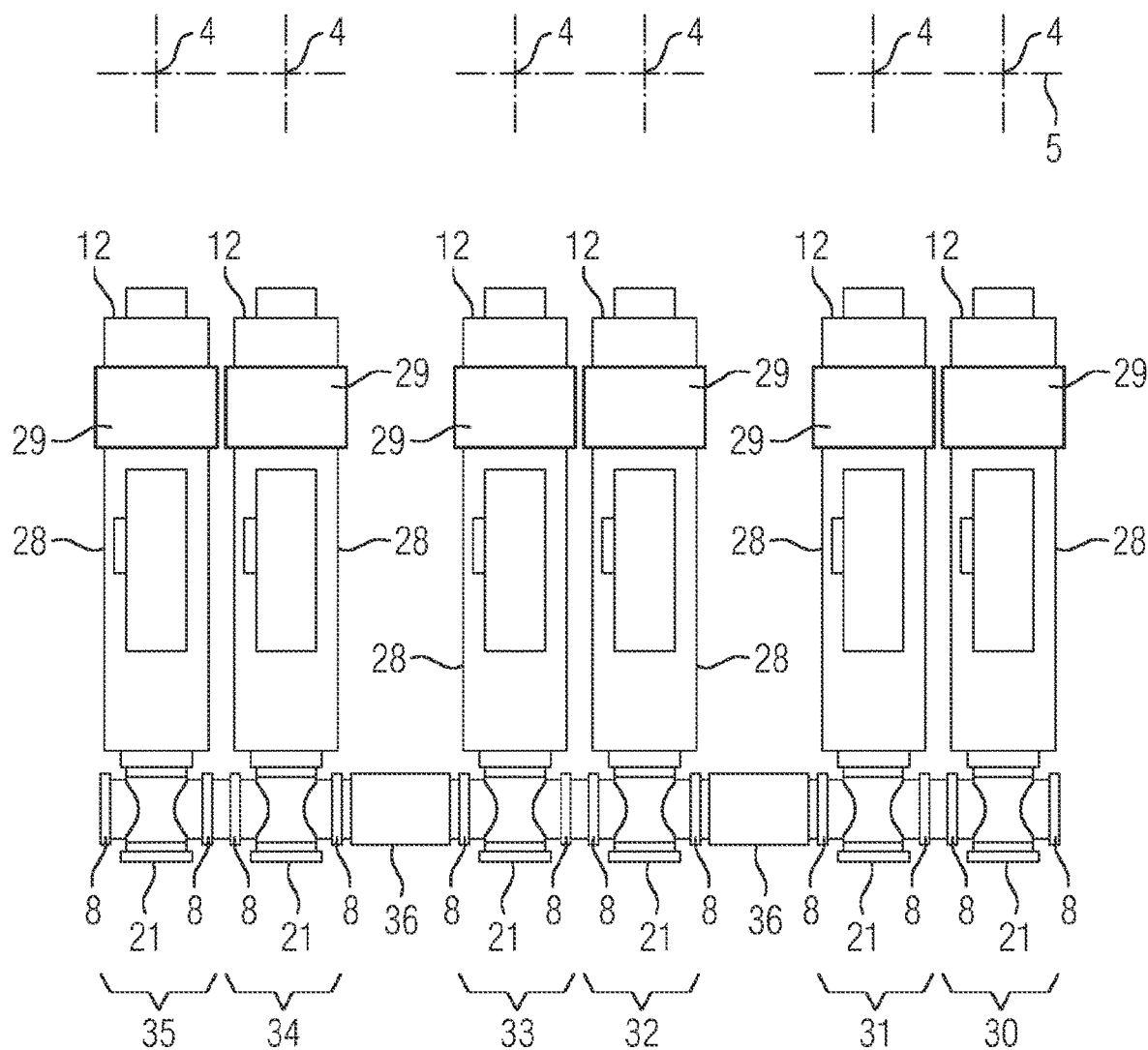
FIG. 4 shows a front-on view of multiphase switchgear having six switch panels.

FIG. 4 shows a front-on view of the switch panels known from FIGS. 1, 2 and 3, these forming switchgear. FIG. 4 shows a front-on view of a first switch panel 30, a second switch panel 31, a third switch panel 32, a fourth switch panel 33, a fifth switch panel 34 and a sixth switch panel 35. The section shown facing the observer in FIG. 4 of the switch panels 30, 31, 32, 33, 34, 35 corresponds to the front-side end of the respective first phase block 1 of the respective switch panel 30, 31, 32, 33, 34, 35. In each case two switch panels 30, 31; 32, 33; 34, 35 are flanged directly to one another via the respective first busbar modules 21 and the second busbar modules 25 behind them, such that the individual vertical switch housing modules 18 are able to be electrically connected to one another via corresponding switching or disconnection of the first and second busbar disconnectors 22, 26. The cables 10 situated flush in the direction of the transverse axis 4 of the various switch panels 30, 31, 32, 33, 34, 35 may accordingly in each case be connected to one another. To allow easier assembly or improved service in the direction of the transverse axis 4 at the switch panels or the individual phase blocks 1, 2, 3 of the switch panels 30, 31, 33 and a first switch panel 32, 34 of an adjacent two switch panels, 35, busbar distancing modules 36 are arranged between each second switch panel 31, 32, 33, 34. The busbar distancing modules 36 continue inside the busbars 23, 27 between the corresponding busbar modules 21, 25. The spacing between each second switch panel 31, 33 and a first switch panel 32, 34 of an adjacent two switch panels furthermore allows simplified positioning of kinematic chains in order to be able to transmit a movement in a distributed manner from a central drive device 29 in the direction of the transverse axis 4.

The invention claimed is:

1. A multiphase switchgear with a plurality of switch panels, each of the plurality of switch panels comprising:
   a vertical input housing module;
   a vertical switch housing module;
   a transverse housing module connecting said vertical input housing module to said vertical switch housing module;
   said vertical input housing module and said vertical switch housing module being spaced apart from one another in a longitudinal direction of said transverse housing module;
   said vertical input housing module, said transverse housing module and said vertical switch housing module forming a single-phase block;
   a grounding switch module either (i) straddled by said transverse housing module, (ii) extending above said transverse housing module, or (iii) extending in a plane of said transverse housing module, said grounding switch module being disposed on at least one of said vertical switch housing module, said vertical input housing module or said transverse housing module; and
   the plurality of switch panels disposed in a row in said longitudinal direction of said transverse housing.

2. The multiphase switchgear with the switch panel according to claim 1, wherein each single-phase blocks has a substantially identical construction to others of said single-phase block.

3. The multiphase switchgear with a switch panel according to claim 1, further comprises at least a second plurality of said switch panels disposed parallel to said plurality of switch panels.

4. The multiphase switchgear with the switch panel according to claim 1, which each of the plurality of switch panels further comprises a busbar housing module disposed on an end face of said vertical switch housing module.

5. The multiphase switchgear with the switch panel according to claim 4, wherein said busbar housing module is covered by said vertical switch housing module.

6. The multiphase switchgear with the switch panel according to claim 1, which each of the plurality of switch panels further comprises a busbar housing module disposed on a side face of said vertical switch housing module.

7. The multiphase switchgear with the switch panel according to claim 1, wherein:
- each of said vertical switch housing module situated in a row in said longitudinal direction of said transverse housing;
- each of said plurality of vertical switch housing module include a breaker unit;
- said plurality of vertical switch housing modules of one of the plurality of switch panels is a front-side vertical switch housing module; and
- a drive device is disposed on said front-side vertical switch housing module and said drive device is coupled to each breaker unit.

8. The multiphase switchgear with the switch panel according to claim 1, wherein said vertical switch housing module of one of the plurality of switch panels is a front-side vertical switch housing module, and a drive device is disposed on said front-side vertical switch housing module and at least partially covers said front-side vertical switch housing module.

9. The multiphase switchgear with the switch panel according to claim 1, wherein: the grounding switch module of all of the plurality of switch panels is straddled by said transverse housing module.

10. The multiphase switchgear with the switch panel according to claim 1, wherein: the grounding switch module of all of the plurality of switch panels extends above said transverse housing module.

11. The multiphase switchgear with the switch panel according to claim 1, wherein: the grounding switch module of all of the plurality of switch panels extends in a plane of said transverse housing module.

12. The multiphase switchgear with the switch panel according to claim 1, which each of the plurality of switch panels further comprises a breaker unit forming a switching path of a power switch.

13. The multiphase switchgear with the switch panel according to claim 1, which each of the plurality of switch panels further comprises a breaker unit forming a switching path of a circuit breaker.

14. The multiphase switchgear with the switch panel according to claim 1, which each of the plurality of switch panels further comprises a breaker unit forming a switching path of a grounding switch.

15. The multiphase switchgear with the switch panel according to claim 1, which each of the plurality of switch panels further comprises:
- a busbar housing module;
- an angular housing module; and
- interfaces or flanges directly or indirectly interconnecting said busbar housing module, said angular housing module, said vertical input housing module, said transverse housing module and said vertical switch housing module.

\* \* \* \* \*